(12) United States Patent
Päkel et al.

(10) Patent No.: US 11,498,607 B2
(45) Date of Patent: Nov. 15, 2022

(54) STEERING SHAFT FOR A MOTOR VEHICLE

(71) Applicants: thyssenkrupp Presta AG, Eschen (LI); thyssenkrupp AG, Essen (DE)

(72) Inventors: Florian Päkel, Buchs (CH); Alexander Scheidbach, Mäder (AT); Mike Wörle, Bremgarten bei Bern (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 297 days.

(21) Appl. No.: 16/764,462

(22) PCT Filed: Nov. 21, 2018

(86) PCT No.: PCT/EP2018/082042
§ 371 (c)(1),
(2) Date: May 15, 2020

(87) PCT Pub. No.: WO2019/101782
PCT Pub. Date: May 31, 2019

(65) Prior Publication Data
US 2020/0353972 A1 Nov. 12, 2020

(30) Foreign Application Priority Data
Nov. 24, 2017 (DE) .................... 10 2017 221 075.3

(51) Int. Cl.
*B62D 1/20* (2006.01)
*B62D 1/185* (2006.01)
(52) U.S. Cl.
CPC .............. *B62D 1/20* (2013.01); *B62D 1/185* (2013.01)

(58) Field of Classification Search
CPC ............. B62D 1/16; B62D 1/185; B62D 1/20
See application file for complete search history.

(56) References Cited

U.S. PATENT DOCUMENTS 3,922,928 A * 12/1975 Kester ...................... B62D 1/20
74/492
4,317,387 A * 3/1982 Myers ..................... F16B 7/105
403/328

(Continued)

FOREIGN PATENT DOCUMENTS

CN 202703673 U 1/2013
CN 104709338 A 6/2015

(Continued)

OTHER PUBLICATIONS

English Translation of International Search Report issued in PCT/EP2018/082042, dated Feb. 13, 2019.

*Primary Examiner* — Laura Freedman
(74) *Attorney, Agent, or Firm* — thyssenkrupp North America, LLC

(57) ABSTRACT

A steering shaft for a motor vehicle may include a hollow outer shaft and an inner shaft. The hollow outer shaft may receive the inner shaft in a torque-transmitting manner and in an axially displaceable manner. An elastic boot may be connected to the inner shaft or the outer shaft. The steering shaft is protected against ingress of dirt and moisture and at the same time has a homogeneous displacement force and can be adjusted with low noise. The boot may be arranged at least partially within the steering shaft and may have a free end with a closed configuration.

15 Claims, 3 Drawing Sheets

(56) References Cited

U.S. PATENT DOCUMENTS

| | | | | |
|---|---|---|---|---|
| 4,667,530 A | * | 5/1987 | Mettler | B62D 1/185 403/359.2 |
| 4,890,505 A | * | 1/1990 | Kinoshita | B62D 1/184 74/531 |
| 5,086,661 A | * | 2/1992 | Hancock | F16D 3/76 464/89 |
| 5,226,853 A | * | 7/1993 | Courgeon | B62D 33/073 280/775 |
| 5,243,874 A | * | 9/1993 | Wolfe | F16F 15/126 280/775 |
| 5,460,574 A | * | 10/1995 | Hobaugh | F16D 3/06 464/180 |
| 5,525,112 A | * | 6/1996 | Smith | F16C 3/03 403/109.8 |
| 6,343,993 B1 | * | 2/2002 | Duval | F16C 3/035 384/49 |
| 6,425,605 B1 | * | 7/2002 | Cholakon | B62D 1/185 280/775 |
| 6,540,618 B1 | | 4/2003 | MacDonald | |
| 6,557,433 B1 | * | 5/2003 | Castellon | F16C 3/035 74/504 |
| 7,198,425 B2 | * | 4/2007 | Bergkvist | B62D 1/20 403/359.5 |
| 7,559,266 B2 | * | 7/2009 | Kurokawa | B62D 1/185 403/359.1 |
| 7,559,267 B2 | * | 7/2009 | Yamada | F16D 3/065 280/775 |
| 10,344,795 B2 | * | 7/2019 | Aoki | F16C 3/03 |
| 11,001,293 B2 | * | 5/2021 | Schmidt | F16C 29/04 |
| 2005/0257639 A1 | * | 11/2005 | Yamada | F16C 33/30 74/493 |
| 2007/0066409 A1 | * | 3/2007 | Sekine | B62D 1/20 464/179 |
| 2008/0314190 A1 | * | 12/2008 | Miyawaki | B62D 1/185 74/496 |
| 2009/0270188 A1 | * | 10/2009 | Yamada | B62D 1/20 74/493 |
| 2015/0166095 A1 | | 6/2015 | Isogai et al. | |
| 2017/0261028 A1 | | 9/2017 | Wilkes | |

FOREIGN PATENT DOCUMENTS

| | | | | |
|---|---|---|---|---|
| CN | 205589291 U | | 9/2016 | |
| CN | 107207034 A | | 9/2017 | |
| DE | 2431388 A | | 1/1975 | |
| DE | 10147131 A | | 5/2002 | |
| DE | 202010017747 U | | 7/2012 | |
| EP | 1136341 A | | 9/2001 | |
| JP | 09014261 A | * | 1/1997 | B62D 1/16 |
| JP | 2004338499 A | | 12/2004 | |
| JP | 2007100731 A | * | 4/2007 | F16C 29/04 |
| JP | 2008261423 A | * | 10/2008 | |
| JP | 2013117271 A | | 6/2013 | |
| JP | 2014134210 A | * | 7/2014 | |

* cited by examiner

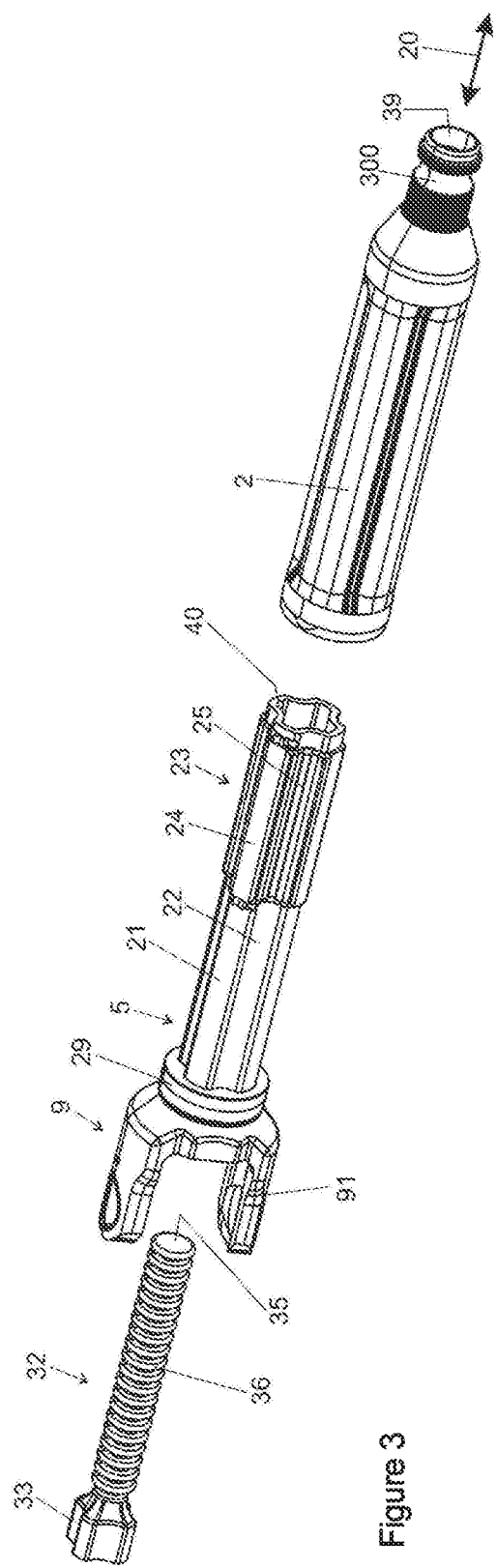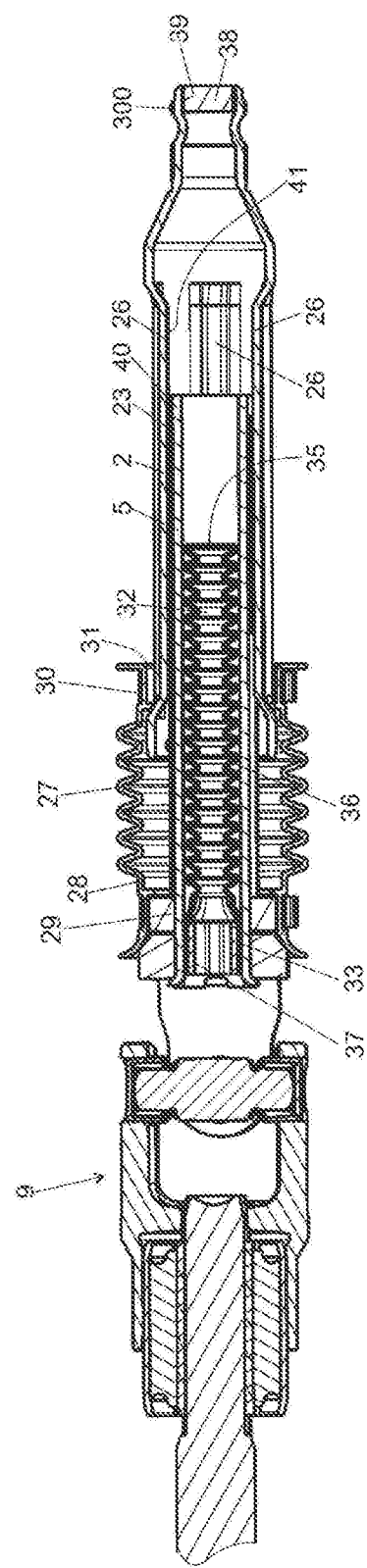

STEERING SHAFT FOR A MOTOR VEHICLE

CROSS REFERENCE TO RELATED APPLICATIONS

This application is a U.S. National Stage Entry of International Patent Application Serial Number PCT/EP2018/082042, filed Nov. 21, 2018, which claims priority to German Patent Application No. DE 10 2017 221 075.3, filed Nov. 24, 2017, the entire contents of both of which are incorporated herein by reference.

FIELD

The present disclosure generally relates to steering shafts, including telescoping steering shafts for motor vehicles.

BACKGROUND

It is known from JP 2013 117 271 A to protect the telescoping region between the inner shaft and the outer shaft against dirt and moisture, by both the inner shaft being closed off with respect to the outer shaft and the interior space of the inner shaft being closed off with respect to the outer region by way of a plug. This measure has the disadvantage that pressure differences are generated in the interior space of the shaft in the case of a telescoping movement of the inner shaft and the outer shaft, as known, for example, from an air pump. Said pressure differences have a disadvantageous influence on the displacement force and lead to disruptive noise.

Thus a need exists for a steering shaft for a motor vehicle that is protected against ingress of dirt and moisture and at the same time has a homogeneous displacement force and can be adjusted with low noise.

BRIEF DESCRIPTION OF THE FIGURES

FIG. 3 is a perspective view of the outer shaft, the inner shaft, and an example boot before assembly.

FIG. 4 is a sectional view of the outer shaft, the inner shaft, and the boot after the assembly.

DETAILED DESCRIPTION

Figure 1:
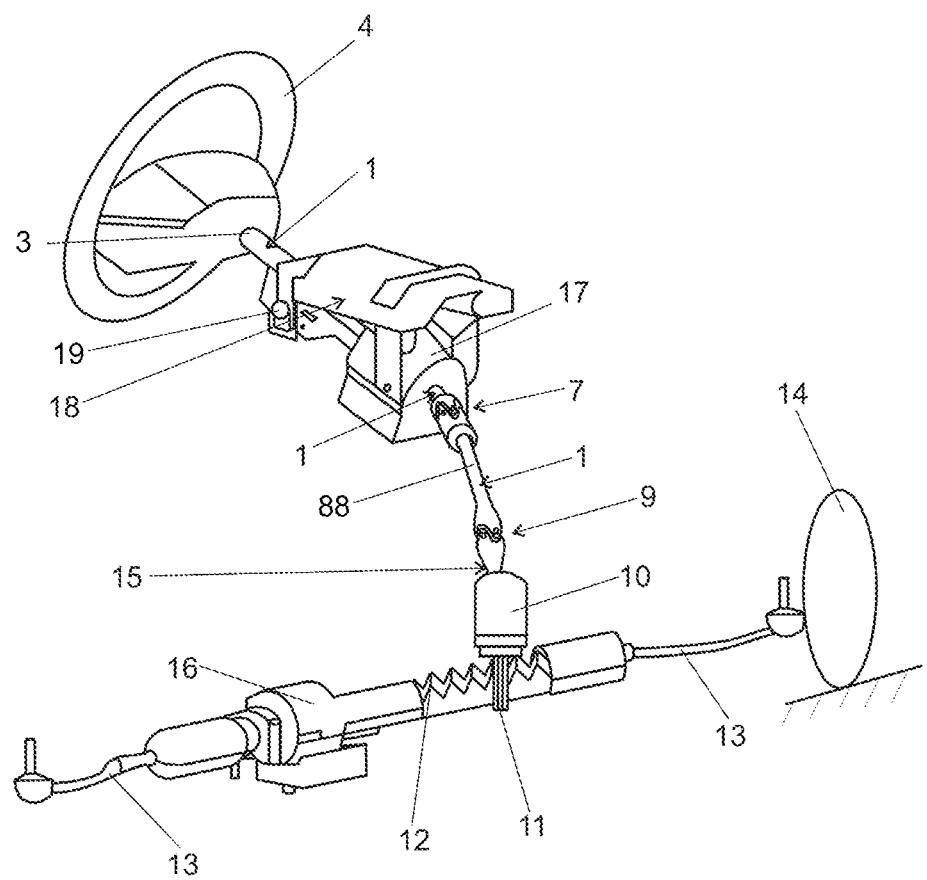
FIG. 1 is a diagrammatic view of an example steering apparatus for motor vehicles with a multiple-piece telescoping steering shaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steering shaft for a motor vehicle. In some examples, the steering shaft may include a hollow outer shaft in which an inner shaft is received in a torque-transmitting and axially displaceable manner. An elastic boot may be connected to the inner shaft or the outer shaft.

In accordance with the invention, the boot is arranged at least partially within the steering shaft.

Thanks to the boot which is arranged at least partially within the steering shaft, the steering shaft is protected at least one of its ends against the ingress of dirt and moisture. At the same time, the air pressure changes which occur in the case of the adjustment of the length of the steering shaft in the axial direction, that is to say in the direction of the longitudinal axis of the steering shaft, by way of telescoping of the outer shaft on the inner shaft are equalized by way of a corresponding volume change of the boot. If, for example, the outer shaft and the inner shaft are telescoped into one another, the volume of their common interior space decreases, which would lead to a pressure rise without the pressure equalization according to the invention, wherein the pressure rise after the telescoping movement would be equalized merely slowly or not at all. In the case of the steering shaft according to the invention, however, the boot is pushed together, with the result that the volume of the interior space of the inner shaft which is taken up by the boot decreases and the volume of the interior space which is filled with air increases. Here, the air which is situated in the interior space of the boot exits into the outer region. The boot therefore makes a pressure equalization possible, as would also result with an open end of the inner shaft without a boot, but nevertheless closes off the interior space of the steering shaft at least at one end of the steering shaft with respect to the surroundings in the process.

In one advantageous refinement of the invention, the boot is arranged completely in the interior of the steering shaft, as a result of which no installation space outside the steering shaft is required.

One embodiment is particularly advantageous, in the case of which the boot is arranged in the interior of the inner shaft, the boot having a coupling section which is fastened to an inner side of the inner shaft. The inner shaft is of at least partially hollow configuration, the interior space of the inner shaft not being utilized in the case of conventional steering shafts and serving merely for the reduction of mass. As a result, the measure according to the invention does not require any additional installation space at all.

In an advantageous way, the boot has a free end, the free end being of closed configuration. A closed end of the boot can already be formed during its manufacture, with the result that a plug or some other closure of its free end can advantageously be dispensed with.

In one preferred embodiment of the invention, the tightness of the steering shaft is improved by virtue of the fact that an opening in the steering wheel-side end of the outer shaft is closed by way of a plug.

It is provided in a further advantageous refinement of the invention that the coupling section has a cross-sectional profile which corresponds with a cross-sectional profile of the inner side of the inner shaft. This measure ensures that the outer faces of the boot in the region of its coupling section can bear tightly against the inner wall of the inner shaft and can close off the interior space of the inner shaft.

The sealing action of the last-mentioned measure can advantageously also be improved, by a supporting sleeve with a cross-sectional profile which is adapted to the cross-sectional profile of the coupling section being arranged within the coupling section of the boot, which supporting sleeve presses the elastic boot from the inside against the inner side of the inner shaft. As a result, a particularly secure seat of the boot on the inner shaft is realized.

The boot is advantageously formed in one piece from an elastomer, preferably from rubber or a thermoplastic elastomer. In this way, both the closure of its free end and the specific profile of its coupling section can be produced in one piece with the actual boot region by way of an inexpensive and simple manufacturing method. As a result, the production of a plurality of individual parts and their assembly are saved.

In a further advantageous refinement of the invention, an outer boot is provided, the first end of which encloses a first section of the circumferential region of the inner shaft, and the second end of which encloses a section of the circumferential region of the outer shaft. By way of said boot, the telescoping region between the inner shaft and the outer shaft is closed off with respect to environmental influences. The boot can be of substantially gas-tight configuration and can be connected to the inner shaft and the outer shaft, in order to reduce or to prevent the ingress of gas, vapor and fine particles.

The outer boot is preferably fixed by means of a first clip on the inner shaft and by means of a second clip on the outer shaft.

The clip can preferably be configured as a hose clip which can be compressed or as a lug clip. A zip tie can also serve as an alternative to a clip.

In order to ensure low-friction and homogeneous sliding of the outer shaft on the inner shaft, it is proposed that a profiled sleeve or a sliding coating is arranged between an end section of the circumferential region of the inner shaft and the inner wall of the outer shaft. As an alternative, a combination consisting of a profiled sleeve and a sliding coating can also be provided.

FIG. 1 shows a steering apparatus for a motor vehicle, in the case of which steering apparatus a steering shaft 1 which consists of a plurality of parts is connected by way of the steering wheel-side end 3 to the steering wheel 4. The steering shaft 1 has a rotary joint 7 which is configured as a universal joint and is connected to a further shaft part 88 of the steering shaft 1. The shaft part 88 is connected to an input shaft 15 of a steering gear 10 via a further rotary joint 9 which is configured as a universal joint. A pinion 11 of the steering gear 10 interacts with a rack 12, with the result that, in the case of a rotation of the steering wheel 4, a lateral linear displacement of the rack 12 results, with the result that the rotational movement of the steering shaft 1 is transferred into a translational movement of the rack 12. The rack 12 is connected at the two ends via track rods 13 to the steered vehicle wheels 14 which can be pivoted by means of the track rods 13. An electromechanical power steering means is accommodated in a housing 16.

The steering shaft 1 is mounted in a guide bracket 17. The guide bracket 17 is fastened pivotably to a carrier part 18 which is connected fixedly to the vehicle chassis, with the result that the steering wheel 4 can be pivoted upward or downward. The guide bracket 17 can be locked by way of a locking apparatus 19, with the result that the height adjustment of the steering wheel 4 is blocked. Moreover, the adjustability of the steering wheel 4 in the axial direction is also blocked by way of the locking apparatus 19. In order to adjust the steering wheel 4 in the axial direction or vertically, the driver can release the locking apparatus 19 manually, and can lock it again after setting it in his/her preferred steering wheel position.

Figure 2:
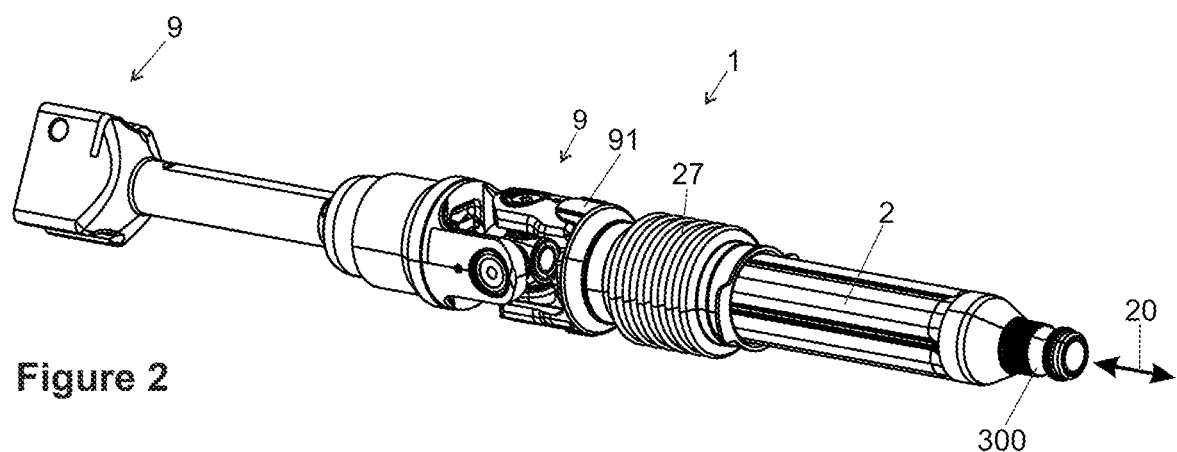
FIG. 2 is a perspective view of a part of the steering shaft with a part section that includes an outer shaft and an inner shaft.
Figure 5:
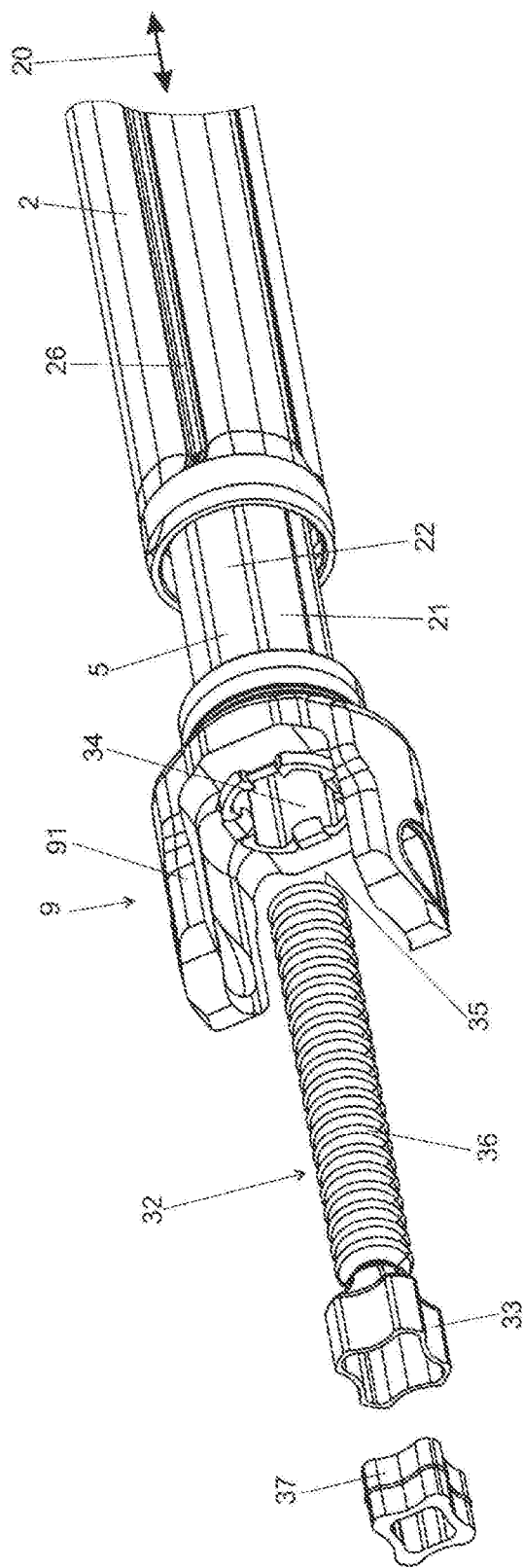
FIG. 5 is a perspective view before assembly of the boot in an interior of the inner shaft.

FIG. 2 shows a part of the steering shaft 1 in a perspective view.

The steering shaft 1 comprises an inner shaft 5 and an outer shaft 2, said shaft engaging into one another in a torque-transmitting manner. The inner shaft has an outer cross-sectional profile which differs from a circular-cylindrical shape and, with a profiled sleeve 23 being connected in between, engages into an inner cross-sectional profile of the outer shaft 2 in a positively locking manner, which inner cross-sectional profile corresponds to the cross-sectional profile of the inner shaft 5. The inner shaft 5 is coupled in a torque-transmitting manner to a yoke 91 of the universal joint 9. The outer shaft 2 has a connecting section 300 which can be coupled to a yoke of the universal joint 7.

As can be seen most clearly in FIGS. 3 and 4, a longitudinal adjustment of the steering shaft 1 in the axial direction 20 is made possible by virtue of the fact that the outer shaft 2 is arranged on the inner shaft 5 such that it can be displaced in the axial direction 20 but in a torque-transmitting manner in the rotational direction. This is made possible by way of specific shaping of the cross-sectional profiles of the outer shaft 2 and the inner shaft 5. Both the outer shaft 2 and the inner shaft 5 are configured as hollow shafts. The inner shaft 5 has a cloverleaf-like cross-sectional profile which can be seen most clearly in FIG. 3. As a result, the inner shaft 5 comprises four radially outwardly protruding projections 21 which extend in the axial direction 20. The four radial projections 21 are arranged distributed over the circumference of the inner shaft 5, with the result that they enclose four radial depressions 22 between them, which depressions 22 are arranged distributed over the circumference of the inner shaft 5 in an alternating manner with the radial projections 21. As an alternative to the cloverleaf-like cross-sectional profile, a spline system or a splined shaft profile can also be provided.

A profiled sleeve 23 is arranged on an end section 40 of the inner shaft 5. The profiled sleeve 23 likewise has a cloverleaf-like cross-sectional profile with four radially outwardly protruding projections 24 and four radial depressions 25 which are arranged in an alternating manner with the radial projections 24 and extend over the entire length of the profiled sleeve 23.

On its inner wall 41, the outer shaft 2 has radially inwardly protruding inner projections 26 which engage into the radial depressions 25 of the profiled sleeve 23. As a consequence of the engagement of the inner projections 26 of the outer shaft 2 into the radial depressions 25 of the profiled sleeve 23 and the engagement of the radial projections 21 of the inner shaft 5 into the depressions which are formed on the inner side of the radial projections 24 of the profiled sleeve 23, turning of the inner shaft 5 with respect to the outer shaft 2 is prevented, with the result that the inner shaft 5 and the outer shaft 2 are connected to one another in a torque-transmitting manner. Nevertheless, the outer shaft 2 can be displaced in the axial direction 20 with respect to the inner shaft 5. Here, the profiled sleeve 23 serves to decrease the effective coefficient of friction between the inner wall 41 of the outer shaft 2 and the profiled sleeve 23 during the mutual displacement in the axial direction 20. The profiled sleeve 23 preferably consists of plastic with favorable sliding friction properties. Instead of the profiled sleeve 23, however, the end section 40 of the outer side of the inner shaft 5 or the inner wall 41 of the outer shaft 2 can also be provided with a sliding coating, or rolling bodies can be arranged between the inner shaft 5 and the outer shaft 2.

In order to close off the axial telescoping region between the inner shaft 5 and the outer shaft 2, an outer boot 27 is provided which is configured as a rubber boot. A first end 28 of the outer boot 27 is connected to a first section 29 of the circumferential region of the yoke 91 and therefore to the inner shaft 5. A second end 30 of the boot 27 is connected to a section of the circumferential region 31 of the outer shaft 2. Here, the outer boot 27 encloses both a piece of the outer shaft 2 and a piece of the inner shaft 5.

A boot 32 which is configured as a pressure equalization boot is arranged in the interior of the steering shaft 1, to be precise in the interior of the inner shaft 5. A coupling section 33 of the boot 32 is fastened to the inner side 34 of the inner shaft 5. A free end 35 of the boot 32 is closed off in an air-tight manner with respect to the outer region, by the boot 32 being of closed configuration at its free end 35. In the region of the coupling section 33, the boot 32 is adapted to the cross-sectional profile of the inner side 34 of the inner shaft 5. The two cross-sectional profiles are of cloverleaf-like configuration.

The pressure equalization boot 32 comprises an elastic material; in the present exemplary embodiment, the boot 32 is formed from an elastomer. The boot 32 is formed in a single work operation in one piece from the rubber material, its bellows-shaped center section 36, its closed free end 35 and its coupling section 33 of cloverleaf-shaped cross-sectional profile being formed, in particular. For improved fixing of the coupling section 33 of the boot 32 on the inner side 34 of the inner shaft 5, a supporting sleeve 37 is provided which has a cloverleaf-like cross-sectional profile which is adapted to the cross-sectional profile of the boot 32. The supporting sleeve 37 is preferably configured from a more rigid and/or stronger material than the boot 32. The supporting sleeve 37 presses the elastic boot 32 from the inside against the inner side 34 of the inner shaft 5, as a result of which the fixed end 33 seals with respect to the inner shaft 5.

The bellows-shaped center section 36 of the boot 32 has a serpentine cross section as viewed in longitudinal section, that is to say in a section which is oriented parallel to the axial direction 20. An opening 39 in the connecting section 300 of the outer shaft 2 is sealed with respect to the outer space or the environment by way of a plug 38 made from an elastic material.

By way of the sealing plug 38, the outer shaft 2 itself, the outer boot 27 which seals the outer shaft 2 with respect to the inner shaft 5, the inner shaft 5 itself and that coupling section 33 of the boot 32 which seals the inner side 34 of the inner shaft 5 with its closed free end 35, a steering shaft which can telescope in the axial direction and is secured against contaminants and the ingress of moisture is provided, which steering shaft ensures a pressure equalization in the case of the adjustment of the inner shaft 5 with respect to the outer shaft 2, by the boot 32 expanding or contracting.

What is claimed is:

1. A steering shaft for a motor vehicle, the steering shaft comprising:
    a hollow outer shaft in which an inner shaft is received in a torque-transmitting manner and in an axially-displaceable manner; and
    a boot that is elastic and is connected to the inner shaft or the outer shaft, wherein the boot is disposed at least partially within the steering shaft, wherein the boot includes a free end with a closed configuration.

2. The steering shaft of claim 1 wherein an opening in a steering-wheel-side end of the outer shaft is closed by way of a plug.

3. The steering shaft of claim 1 wherein the boot is disposed in an interior of the inner shaft, the boot including a coupling section that is fastened to an inner side of the inner shaft.

4. The steering shaft of claim 3 wherein the coupling section has a cross-sectional profile that corresponds with a cross-sectional profile of the inner side of the inner shaft.

5. The steering shaft of claim 4 wherein a supporting sleeve with a cross-sectional profile that is adapted to the cross-sectional profile of the coupling section is disposed within the coupling section of the boot, wherein the supporting sleeve presses the boot from an inside against the inner side of the inner shaft.

6. The steering shaft of claim 1 wherein the boot is a single elastomeric piece.

7. The steering shaft of claim 1 comprising an outer boot, wherein a first end of the outer boot encloses a first section of a circumferential region of the inner shaft, wherein a second end of the outer boot encloses a section of a circumferential region of the outer shaft.

8. The steering shaft of claim 7 comprising a profiled sleeve or a sliding coating between an end section of the circumferential region of the inner shaft and an inner wall of the outer shaft.

9. A steering shaft for a motor vehicle, the steering shaft comprising:
    a hollow outer shaft in which an inner shaft is received in a torque-transmitting manner and in an axially-displaceable manner; and
    a boot that is elastic and is connected to the inner shaft or the outer shaft, wherein the boot is disposed at least partially within the steering shaft, wherein the boot is disposed in an interior of the inner shaft, the boot including a coupling section that is fastened to an inner side of the inner shaft.

10. The steering shaft of claim 9 wherein the coupling section has a cross-sectional profile that corresponds with a cross-sectional profile of the inner side of the inner shaft.

11. The steering shaft of claim 10 wherein a supporting sleeve with a cross-sectional profile that is adapted to the cross-sectional profile of the coupling section is disposed within the coupling section of the boot, wherein the supporting sleeve presses the boot from an inside against the inner side of the inner shaft.

12. The steering shaft of claim 9 wherein an opening in a steering-wheel-side end of the outer shaft is closed by way of a plug.

13. The steering shaft of claim 9 wherein the boot is a single elastomeric piece.

14. The steering shaft of claim 9 comprising an outer boot, wherein a first end of the outer boot encloses a first section of a circumferential region of the inner shaft, wherein a second end of the outer boot encloses a section of a circumferential region of the outer shaft.

15. The steering shaft of claim 14 comprising a profiled sleeve or a sliding coating between an end section of the circumferential region of the inner shaft and an inner wall of the outer shaft.

* * * * *